(12) United States Patent
Lusk et al.

(10) Patent No.: US 8,764,049 B2
(45) Date of Patent: Jul. 1, 2014

(54) SIDE AIRBAG MODULE ASSEMBLY

(75) Inventors: Bobby Lusk, Lake Orion, MI (US); Bin Wang, Windsor (CA); Brian Czach, Shelby Township, MI (US); Bradley W. Smith, Plain City, UT (US); Charles Richards, Farmington, UT (US); Louis Mueller, Roy, UT (US); Mark S. Hatfield, Providence, UT (US); Brett Richard Garner, South Weber, UT (US)

(73) Assignee: Autoilv ASP, Inc., Ogden, UT (US)

( * ) Notice: Subject to any disclaimer, the term of this patent is extended or adjusted under 35 U.S.C. 154(b) by 363 days.

(21) Appl. No.: 13/179,801

(22) Filed: Jul. 11, 2011

(65) Prior Publication Data
US 2013/0015640 A1 Jan. 17, 2013

(51) Int. Cl.
B60R 21/16 (2006.01)

(52) U.S. Cl.
USPC ..................... 280/728.2; 280/730.2

(58) Field of Classification Search
USPC ........................... 280/728.2, 730.2
See application file for complete search history.

(56) References Cited

U.S. PATENT DOCUMENTS

| | | | | |
|---|---|---|---|---|
| 5,538,277 A | * | 7/1996 | Frary et al. | 280/728.2 |
| 5,547,214 A | | 8/1996 | Zimmerman et al. | |
| 5,639,111 A | * | 6/1997 | Spencer et al. | 280/728.2 |
| 5,669,627 A | * | 9/1997 | Marjanski et al. | 280/728.3 |
| 5,676,393 A | * | 10/1997 | Rose | 280/728.3 |
| 5,676,394 A | * | 10/1997 | Maly | 280/728.3 |
| 5,735,572 A | * | 4/1998 | Clark et al. | 297/216.13 |
| 5,799,970 A | | 9/1998 | Enders et al. | |
| 5,803,490 A | * | 9/1998 | Seventko et al. | 280/730.2 |
| 5,944,342 A | * | 8/1999 | White et al. | 280/729 |
| 5,979,979 A | | 11/1999 | Gueninot et al. | |
| 6,179,324 B1 | * | 1/2001 | White et al. | 280/730.2 |
| 6,382,665 B2 | | 5/2002 | Holdampf et al. | |
| 7,641,226 B2 | | 1/2010 | Sundmark et al. | |
| 2008/0203787 A1 | | 8/2008 | Tracht et al. | |

FOREIGN PATENT DOCUMENTS

DE 101 41 461 B4 8/2004
DE 10340508 A1 * 3/2005 ............ B60R 21/22

* cited by examiner

Primary Examiner — Faye M. Fleming
(74) Attorney, Agent, or Firm — Brinks Gilson & Lione

(57) ABSTRACT

A side airbag module assembly for a vehicle seat back rest features a molded plastic cover (22) with a Class A surface constituting the outside of the cover visible after installation in the backrest (60). A base plate (32) of an airbag holder (24) made of metal or plastic is rigidly connected to the cover (22) by insert-molding or a different method of attachment. A fastening bracket (34) is integrally formed onto the base plate (32). An airbag (15) including a gas generator (14) is prepackaged in a soft pack (12) with fasteners (20) protruding from the soft pack (12). The fasteners (20) and the fastening bracket (34) are configured to attach the soft pack (12) to the airbag holder (24). Upon deployment of the airbag, the fastening bracket (34) will bend and thereby open the cover (22), which allows the airbag (15) to inflate in a forward direction.

12 Claims, 3 Drawing Sheets

SIDE AIRBAG MODULE ASSEMBLY

FIELD OF THE INVENTION

The present invention generally relates to airbags for use as an impact protection device for an occupant of a motor vehicle. More specifically, it relates to a side airbag module with a gas generator and a folded airbag accommodated in a back rest of a vehicle seat also called seat back. The airbag unfolds into the interior of the motor vehicle when the associated gas generator is activated by an electrical signal received from an electronic control unit of the vehicle when an impact is sensed.

BACKGROUND OF THE INVENTION

A usual design of a side airbag module includes a gas generator mounted inside a cavity in a side bolster of a back rest of a vehicle seat. The gas generator is mounted on a backside of the seat cavity and projects inflation gas in a forward direction of the vehicle. In the seat cavity, a folded airbag is arranged around and attached to the gas generator. The seat cavity is enclosed by a cover made of a molded shell of optically appealing plastic material that conceals the airbag module. The cover has an intentionally weakened seam or line of reduced thickness designed to break when the gas generator inflates the airbag.

The above-described known airbag arrangement, in which the gas generator is mounted in the side bolster of the vehicle seat back, has the disadvantage that each part of the gas generator must be individually attached to a fastening structure inside the seat cavity that may not be easily accessible for assembly.

SUMMARY OF THE INVENTION

It is the objective of the present invention to eliminate the module housing and integrate the deflector plate and the Class A cover This objective is met by the following measures. The airbag module assembly comprises a molded plastic cover with a so-called Class A surface constituting the outside of the cover visible to an occupant after installation of the seat. Opposite to the Class A surface of the cover, a base plate of an airbag holder made of metal or high-strength plastic is molded or rigidly connected to the cover. A fastening bracket is integrally formed with the base plate. An airbag including a gas generator with fasteners is prepackaged in a soft pack. The soft pack is covered by a wrapper made of a thin woven or non-woven textile material, plastic, or foil cover with the fasteners penetrating the wrapper material. The wrapper has a designated tear line of weakened material or a tear seam. The wrapper could also be merely a tape or flap used to hold the assembly together and may not require a tear seam. The fasteners and the fastening bracket are configured to attach the soft pack to the airbag holder.

Further details and advantages of the present invention will become apparent from the following description of exemplary embodiments illustrated by drawings.

DETAILED DESCRIPTION OF PREFERRED EMBODIMENTS

Figure 1:
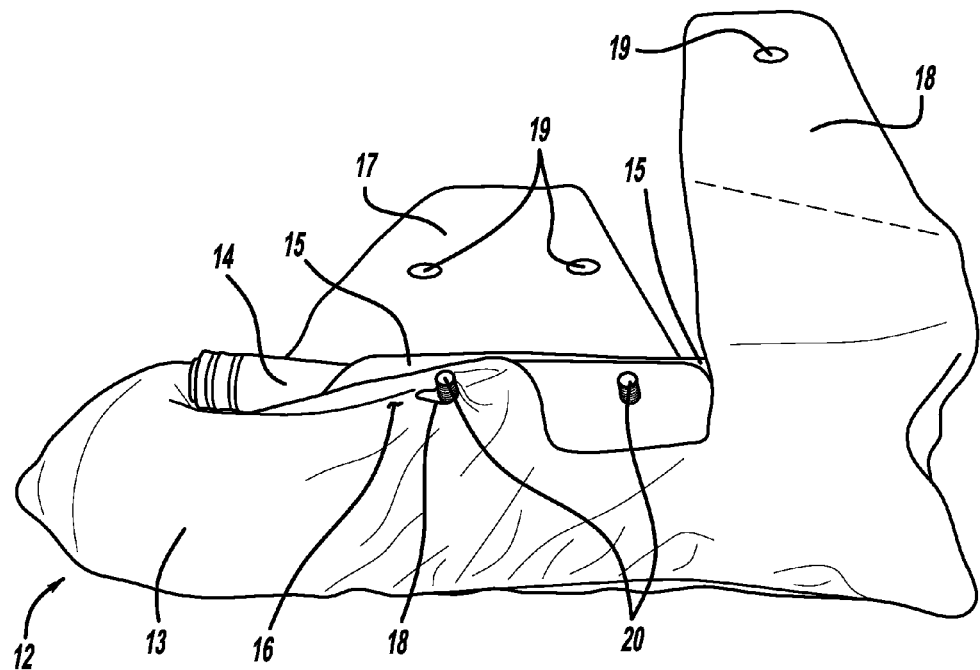
FIG. 1 shows a subassembly of an airbag and a gas generator currently being wrapped into a soft pack.
Figure 2:
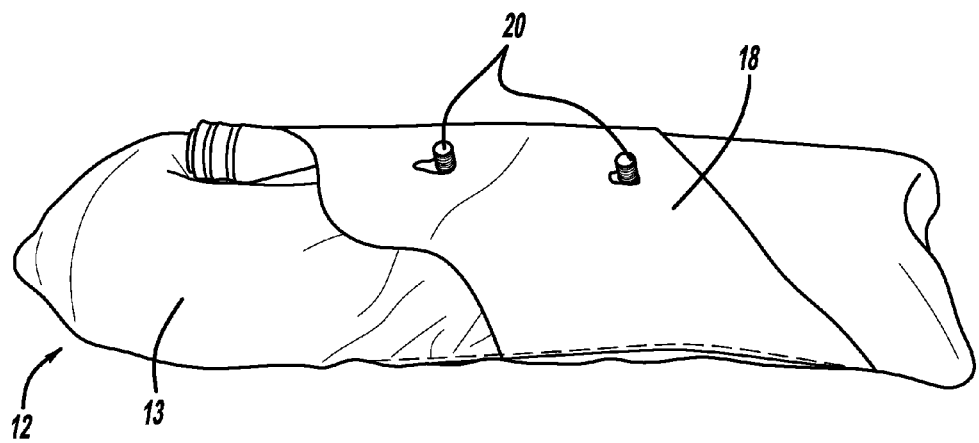
FIG. 2 shows the subassembly of FIG. 1 wrapped in the soft pack.
Figure 3:
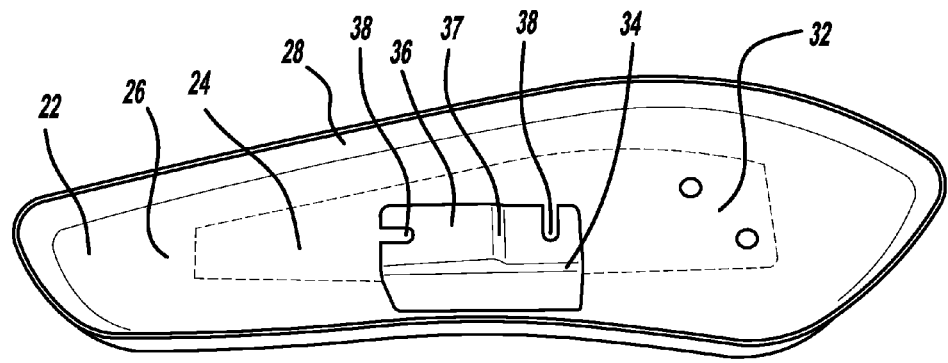
FIG. 3 shows a cover with an attached base plate, which includes an airbag holder with an integral fastening bracket.
Figure 4:
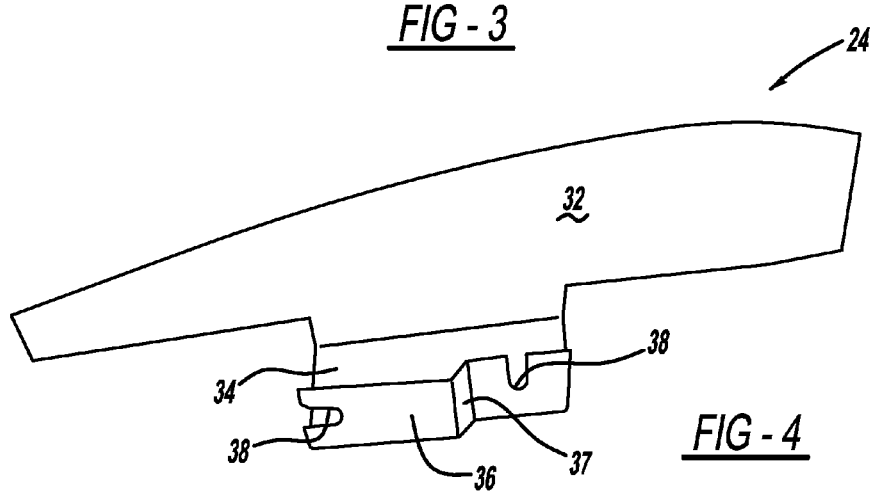
FIG. 4 shows a different view of the airbag holder of FIG. 3
Figure 5:
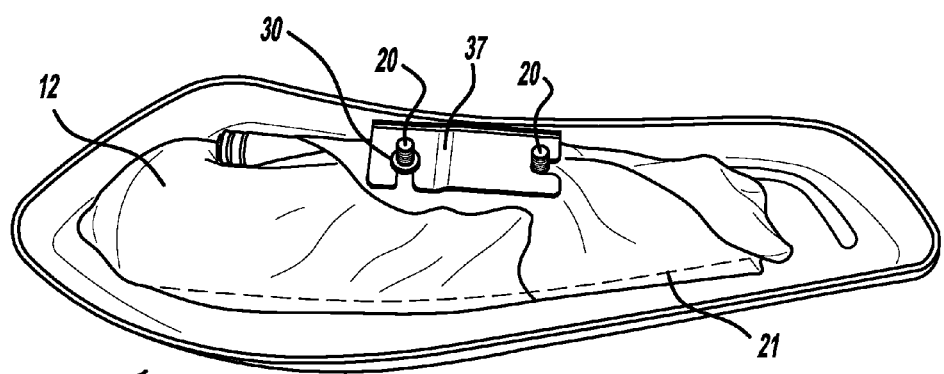
FIG. 5 shows the soft pack of FIG. 1 attached to the fastening bracket of the airbag holder.

FIGS. 1-4 detail steps of assembling a side airbag module 10 as shown in FIG. 5, starting with an airbag soft pack 12 depicted in FIGS. 1 and 2. The soft pack 12 features a wrapper 13 with a first flap 16, a second flap 17, and a third flap 18 and envelops a folded airbag 15 and a gas generator 14. Two threaded fastening bolts 20 connected to the gas generator 14 penetrate the three flaps 16-18 of the wrapper 13 from the inside to the outside. The first flap 16 is wrapped in a first direction and overlaps one of the fastening bolts 20 that protrudes through the first flap 16 through a corresponding hole 19. The second flap 17 is wrapped in the opposite direction of the first flap 16, partially overlapping the latter and has two holes 19 hitched onto both of the bolts 20. The third flap 18 extends in the same direction as the first flap 16, partially overlapping with the second flap 17. The third flap 18 has one hole 19 attached to the bolt 20 left free by the first flap 16. The wrapper 13 is made of woven or non-woven textile material, plastic, or foil and has an intentionally weak seam 21 in the wrapper 13 designed to tear open when the gas generator 14 inflates the airbag 15 inside the wrapper 13.

FIG. 3 shows a cover 22 made of molded plastic material. The cover 22 has an elongated shape with two long sides and two short sides to cover a matching cavity opening in a side bolster of a back rest of a vehicle seat. The cover 22 features an exterior surface (not visible in FIG. 3) that meets Class A standards, either by being covered with upholstery fabric or by its own preferably textured appearance. An interior surface of the cover 22 has a center area 26 that is substantially flat, framed by a rim 28 bent toward the interior side of the cover 22. An airbag holder 24 with a base plate 32 and a fastening bracket 34 integral with the base plate 32. FIG. 4 shows the airbag holder in a different view that illustrates how the base plate 32 and the fastening bracket 34 are formed of one piece of metal or high-strength plastic. The fastening bracket bends under forces exerted during the inflation of the airbag 15. The base plate 32 of the airbag holder 24 has a shape adapted to and slightly smaller than the center area 26 of the cover 22 and is rigidly attached to the center area 26 of the cover 22. In the shown embodiment, the base plate 32 is molded into the plastic of the cover 22 as indicated by a broken line tracing the contour of the base plate 32. The attachment of the base plate 32 to the center area 26 may alternatively be accomplished by using an adhesive—as shown in FIG. 6—or by another durable method, such as fasteners.

The fastening bracket 34 protrudes from the base plate 32. In the shown embodiment, the fastening bracket includes two 90-degree bends that create a flange 36 extending substantially parallel to the base plate in a direction toward the center of the base plate 32 with a step 37 leaving space for an intermediate nut 30 as illustrated in FIG. 5. The flange 36 displays two slots 38 arranged perpendicular to each other and dimensioned to receive the threaded bolts 20 of the soft pack 12. Evidently, the slots 38 can be arranged at other angles or even parallel to each other.

Due to the perpendicular arrangement of the slots 38, the threaded bolts 20 are individually inserted into the slots 38 as shown in FIG. 5. A nut 30 is applied to one of the threaded bolts 20 and to fixate the soft pack 12 in the airbag holder 24. The step 37 compensates the thickness of the nut 30. After completing the foregoing steps, the side airbag module 10 is ready for installment in a vehicle seat.

Figure 6:
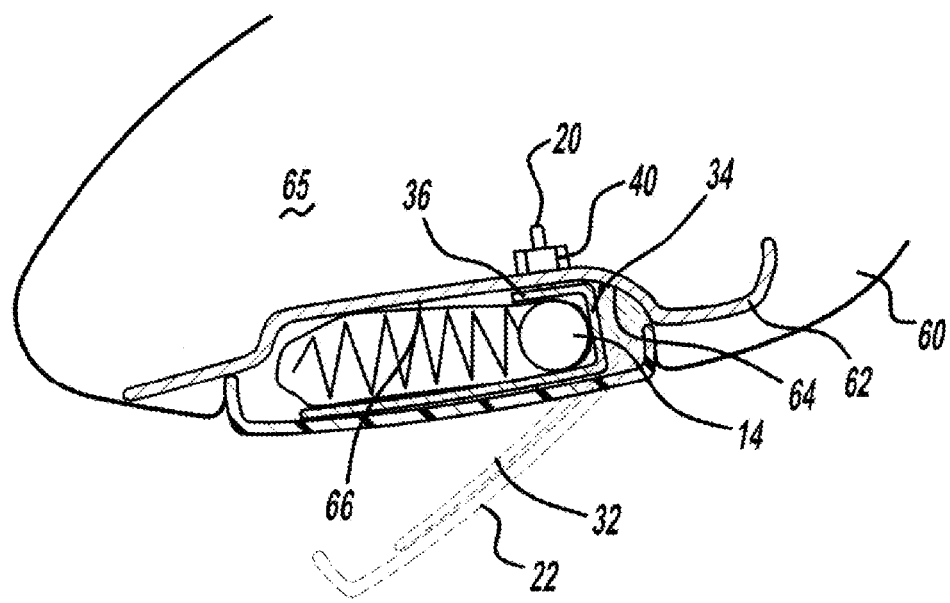
FIG. 6 shows a cross-sectional view through a back rest with an installed side airbag module of FIGS. 1-4.

FIG. 6 shows a schematic view of aside airbag module 10 similar to the module shown in FIG. 4 installed in a back rest 60 of a vehicle seat. The embodiment shown in FIG. 6 differs from FIG. 4 in that the base plate 32 is attached to the cover 22 by a suitable adhesive. The back rest 60 installed in a vehicle facing the left side of FIG. 5. A seat frame 62 has a cavity 64 adapted to receive the side airbag module 10 in a side bolster 65. The bolts 20 protruding from the side airbag module are inserted through matching holes (not visible) in a back wall 66 of the cavity 64 and secured with fastening nuts 40 in a plane extending substantially parallel to the base plate 32.

After installation, the cover 22 covers the entire cavity flush with the side bolster. The base plate 32, which is formed in one piece with the fastening bracket 34, extends along the cover 22 attached thereto. The fastening bracket 34 extends from the cover 22 to the back wall 66 where the flange 36 is aligned with and attached to the back wall 66.

In FIG. 6, the function of the airbag holder 24 is illustrated. When the gas generator 14 inflates the airbag 15, the gas pressure exerts a force on the base plate 32 and the cover 22. This outward force rotates the cover 22 and the base plate 32 outwards as indicated in FIG. 6 allowing the airbag 15 to expand in a substantially forward direction with respect to the vehicle.

Figure 7:
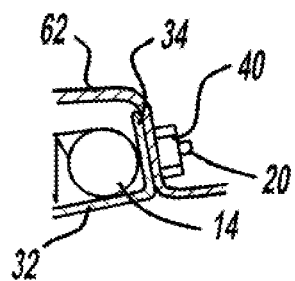
FIG. 7 shows a detail of an alternative arrangement of installing a side airbag module in a back rest.

FIG. 7 illustrates an alternative way of attaching the fastening bolts 20 to the seat frame 62. In the embodiment shown in FIG. 7, the fastening bolts 20 penetrate the fastening bracket 34 and the seat frame 62 in a plane perpendicular to the Class A surface. Accordingly, a portion of the seat frame 62 extends perpendicular to the base plate 32 and the cover 22 (not shown in FIG. 7) for securing the fastening bolts with fastening nuts 40

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A side airbag module assembly for use in a motor vehicle and adapted to be installed into a module cavity formed in an occupant seat back, the cavity receiving the module assembly in an uninflated state, the assembly comprising:
    a plastic cover dimensioned to cover the cavity and forming an exposed surface,
    an airbag assembly having an inflator, a folded airbag, and a fastening device, and
    an airbag holder rigidly attached to the cover and having a fastening structure configured to cooperate with the fastening device and configured to be fastened to the seat back wherein upon deployment of the module assembly, the folded airbag inflates, causing the cover to move to expose the airbag assembly cavity and allowing the airbag to deploy from the cavity, wherein the airbag holder consists of a fastening bracket and an integrally attached base plate, the base plate extending parallel to the exposed surface.

2. The assembly of claim 1, further comprising that the base plate is molded into the cover.

3. The assembly of claim 1, further comprising that the base plate is connected to the cover with an adhesive.

4. The assembly of claim 1, further comprising that the base plate is connected to the cover with fasteners.

5. The assembly of claim 1, wherein the airbag holder is made of metal.

6. The assembly of claim 1, wherein the airbag holder is made of plastic.

7. A side airbag module assembly for use in a motor vehicle and adapted to be installed into a module cavity formed in an occupant seat back, the cavity receiving the module assembly in an uninflated state, the assembly comprising:
    a plastic cover dimensioned to cover the cavity and forming an exposed surface,
    an airbag assembly having an inflator, a folded airbag, and a fastening device, and
    an airbag holder rigidly attached to the cover and having a fastening structure configured to cooperate with the fastening device and configured to be fastened to the seat back wherein upon deployment of the module assembly, the folded airbag inflates, causing the cover to move to expose the airbag assembly cavity and allowing the airbag to deploy from the cavity,
    wherein the airbag holder includes a fastening bracket having a flange with slots.

8. The assembly of claim 7, further comprising that the slots are configured to cooperate with threaded bolts to be secured by threaded nuts.

9. The assembly of claim 8, further comprising that the fastening device is attached to the gas generator and protrudes from the airbag assembly.

10. A side airbag module assembly for use in a motor vehicle and adapted to be installed into a module cavity formed in an occupant seat back, the cavity receiving the module assembly in an uninflated state, the assembly comprising:
    a plastic cover dimensioned to cover the cavity and forming an exposed surface,
    an airbag assembly having an inflator, a folded airbag, and a fastening device,
    an airbag holder rigidly attached to the cover and having a fastening structure configured to cooperate with the fastening device and configured to be fastened to the seat back wherein upon deployment of the module assembly, the folded airbag inflates, causing the cover to move to expose the airbag assembly cavity and allowing the airbag to deploy from the cavity, and
    a wrapper enclosing the inflator and the folded airbag to form a soft pack.

11. The assembly of claim 10, further comprising that the wrapper has at least one designated tear line of weakened strength.

12. The assembly of claim 10, further comprising that the cover is configured to be faced with upholstery fabric, leather or as any molded decorative class A surface.

* * * * *